United States Patent [19]
Drake et al.

[11] 3,945,331
[45] Mar. 23, 1976

[54] THERMAL RECOVERY SYSTEM

[75] Inventors: Dale E. Drake, Concrete; Jerry J. Nelson, Sedro Woolley, both of Wash.

[73] Assignee: Enertherm, Inc., Mount Vernon, Wash.

[22] Filed: Jan. 23, 1975

[21] Appl. No.: 543,491

[52] U.S. Cl. .................... 110/7 R; 34/47; 110/119
[51] Int. Cl.² .......................................... F23G 7/00
[58] Field of Search.......... 110/8 R, 7 R, 119; 34/47, 34/86, 229; 122/494

[56] References Cited
UNITED STATES PATENTS

| | | | |
|---|---|---|---|
| 2,132,656 | 10/1938 | Smith | 34/47 |
| 2,202,995 | 6/1940 | Porwancher | 34/47 X |
| 2,735,266 | 2/1956 | Atherton | 110/7 X |
| 3,029,798 | 4/1962 | Folds | 122/494 |
| 3,104,187 | 9/1963 | Jenkins et al. | 34/229 X |
| 3,437,324 | 4/1969 | Wellons | 110/119 X |
| 3,675,600 | 7/1962 | Jones | 110/8 |

*Primary Examiner*—Kenneth W. Sprague
*Attorney, Agent, or Firm*—Warren J. Krauss

[57] ABSTRACT

A dual function thermal recovery system for reducing pollutant emissions to the ambient and for utilizing normally wasted heat energy for beneficial purposes. A simple and efficiently operative assemblage of components for directly transmitting outlet stack gasses from an incinerator to a point of utilization such as a wood drying kiln, heat exchanger, or the like. A conduit connected directly to the outlet gas stack of the incinerator directs such outlet gas to the inlet of a constant volume centrifugal gas pump. Proximate the inlet of the gas pump, a branch conduit intersects the hot gas conveying conduit. An automatically thermostatically controlled valve is located within the branch conduit in selectively blocking relationship to relatively cool ambient air. An exhaust conduit is connected directly to the outlet of the gas pump for directing the output of such pump to a point of direct utilization, such as a drying kiln. By thermostatically controlling the valve which controls gas passage through the ambient air inlet branch conduit, the proportion of hot and relatively cool ambient gasses and consequently the temperature of the mixed gasses will be regulated since the gas pump or fan continues to transmit a fixed gas volume to the drying kiln.

12 Claims, 2 Drawing Figures

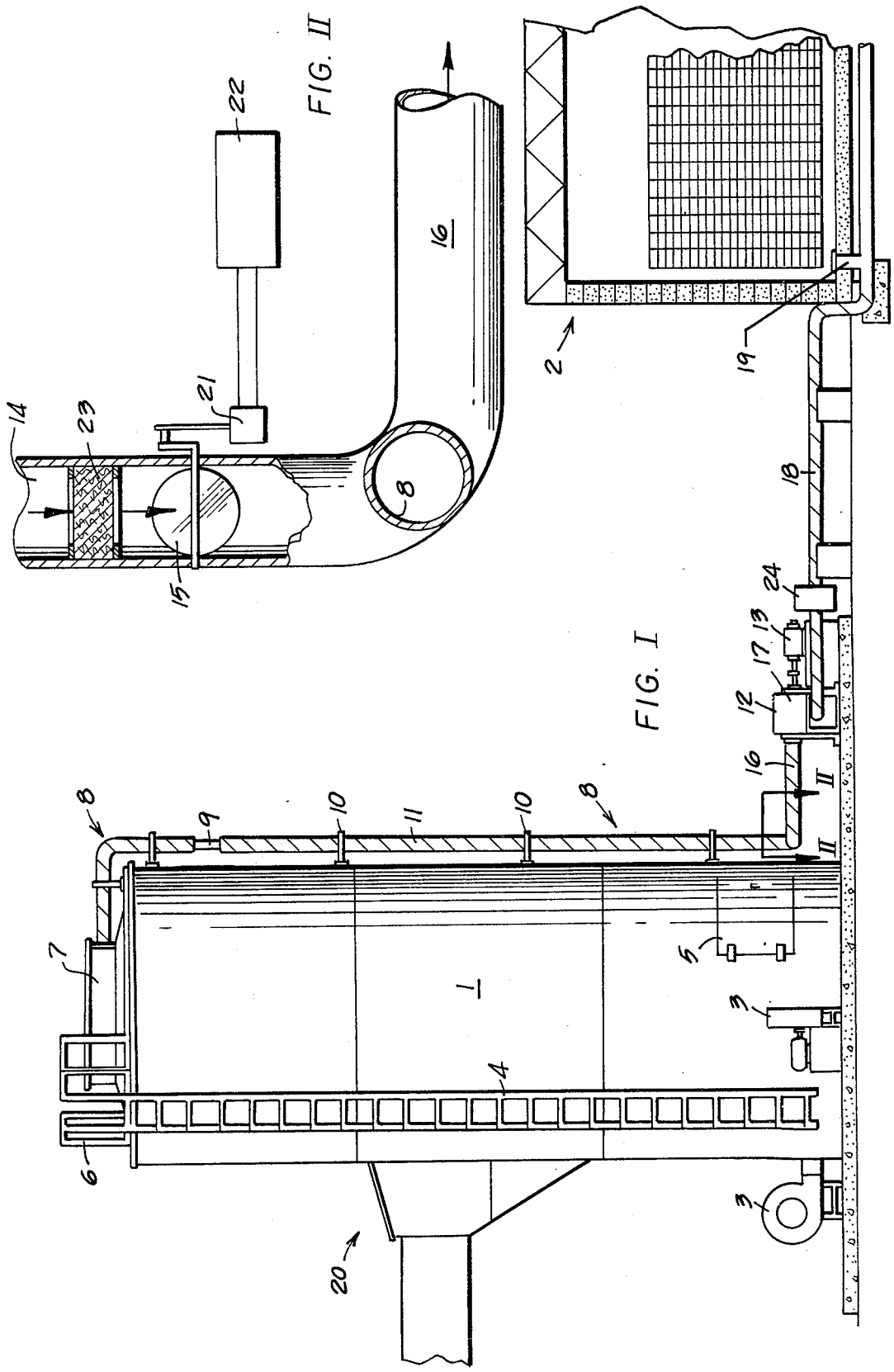

000
THERMAL RECOVERY SYSTEM

BACKGROUND OF THE INVENTION

This invention relates to a dual purpose thermal recovery system for reducing industrial air pollution and for advantageously utilizing normally wasted heat energy. In particular, the invention relates to a thermal recovery system which directly utilizes hot exhaust gasses from a cyclone incinerator for drying lumber in a kiln.

Increased public awareness of the need to protect the environment by drastically reducing industrial air pollution and by conserving the earth's natural resources as well as specific legislation such as the Air Pollution Control Agency regulations have made it incumbent upon industry to develop new methods and means for operating within reasonable environmental guidelines.

In industrial operations wherein waste product production is voluminous, the problem is particularly vexatious. Due to the impracticability of ocean dumping and in view of the many difficulties connected with the sanitary land fill operations, incineration of waste materials has traditionally been industry's solution to the disposal problem. However, many present day incinerating operations do not meet environmental standards inasmuch as they often involve direct exhaustion of high temperature pollutant laden products of combustion into the atmosphere. Such systems are also generally wasteful of the energy contained in such combustion products.

Many prior attempts have been made to address these and other related problems. Examples of such attempts are found in U.S. Pat. Nos. 1,809,628; 2,171,535; 2,553,452 2,933,826; 2,938,714; 3,233,664; 3,486,841 to Johnson, Berg et al, Guthrie, Justuce, Gerrish, Jacobs, and Betz, respectively.

While many of the prior systems attempted to recover waste heat and to utilize such energy for beneficial purposes, none have provided a simple and practical means for directly using hot waste gasses for a particular purpose by means of controlling the temperature and volume of such gasses sent to the point of utilization through the controlled mixture of such gasses with cool ambient air and by the constant volume pumping of the mixed gasses to the point of utilization. Such a system which appears to have eluded industry thus far, represents an economically viable add-on or accessory means for attachment to existing incinerator structures without prohibitively expensive plant modifications or scrapping of existing apparatus.

SUMMARY AND OBJECTS OF THE INVENTION

The instant invention provides a thermal recovery system which, when attached to an industrial waste incinerator, directly transmits hot waste gasses from the incinerator to a point of direct utilization. The system includes a constant volume gas pump having an inlet connected to a pair of branched conduits, one of which directly communicates with the exhaust stack of the incinerator and the other of which communicates directly with relatively cool ambient air. An automatically actuated thermostatically controlled butterfly valve is disposed within the inlet of the ambient air branch conduit for constantly and selectively controlling the ingress of the relatively cool ambient air and consequently the proportion of hot exhaust gas which, after mixing, reaches the inlet of the gas pump. Hot and cool gas mixing occurs primarily in a mixing chamber leading to the inlet of the gas pump and complete mixing occurs within the pump itself. The controlled temperature mixed gasses are then transmitted to a point of utilization such as a lumber drying kiln or the like.

Accordingly, the primary object of this invention is to provide means for controlling industrial air pollution and for recovering and directly using heat energy from waste product incineration.

Another object of this invention is to provide a thermal recovery system particularly applicable to the lumber mill industry wherein there is a need to incinerate large quantities of waste wood products and corresponding need for hot, relatively clean gas for lumber drying purposes.

A further object of this invention is to provide an add-on thermal recovery system utilizable as an accessory to any industrial incinerator having a direct hot gas exhaust system.

Still another object of the present invention is to provide a simple, relatively inexpensive thermal recovery system having few moving parts which is readily adaptable to a plurality of applications with minor structural modifications.

Other objects and advantages of the invention will become readily apparent from the following description and drawings.

BRIEF DESCRIPTION OF THE DRAWING

FIG. 1 is a partially sectioned elevation of the instant thermal recovery system used in a lumber mill operation; and FIG. 2 is a sectional view taken along the lines II—II of FIG. 1.

DETAILED DESCRIPTION

The drawing shows the present thermal recovery system utilized in a lumber mill operation. The operation includes a waste products incinerator 1, which could be of any conventional design, but is illustrated as a so-called "cyclone" incinerator.

The incinerator includes a waste products admission hood 2 which receives refuse from a conveyor or like means and transfers it to the interior of the incinerator for combustion. Combustion supporting air is forced into the incinerator by means of a plurality of blowers 3, which are most suitably centrifugal fans. Access to the various exterior components of the incinerator is provided by a ladder and catwalk system shown generally at 4 and 6 and access to the interior of the incinerator is provided by door means 5. The products of combustion of the burning refuse in the incinerator would normally be conveyed through a stack and spark arrestor means 7 to the ambient. It is to this stack means that the instant thermal recovery system is directly connected by means of a conduit or duct 8.

Depending upon the size of the incinerator and the heat output thereof, the recovery conduit 8 may be provided with one or more thermal expansion joints 9 for automatic dimension adjustments under the influence of high temperatures. The recovery conduit may also be provided with suitable insulating material 11 to minimize heat losses in transmission of hot gasses from the incinerator. The recovery conduit may be attached to the incinerator by any suitable means such as a plurality of support bracket means 10 or the like.

By reference to the drawing, it may be seen that the recovery conduit 8, which comprises the first major component of the recovery system, directly communicates with a laterally disposed length of conduit 16 which serves as a pre-mixing duct. As best shown in FIG. 2, the pre-mixing duct 16 also communicates directly with a short conduit section which directly communicates with the relatively cool ambient air through an inlet 14. Disposed directly within the inlet 14 is a valve means, such as a butterfly valve or the like, capable of moving between a position allowing full influx of ambient air to the premixing duct to a position in which flow of such air is totally blocked. The position of such valve within the air inlet duct is suitably thermoststically controlled, as will be explained more fully hereinafter.

Immediately downstream of the premixing duct 16 is a constant volume gas pumping means 12 such as a centrifugal compressor or the like. The pre-mixing duct is connected to the inlet of such pump and suitable conventional filtering means are also provided adjacent the connection. The pumping means is conveniently driven by means of a suitable electric, internal combustion, or fluid motor means 13.

Directly connected to the outlet of the pumping means 12 is a manifold or mixing chamber 17 which chamber is directly communicated with a mixed gas duct 18, suitably insulated as in the case of the recovery duct 8. The duct 18 is provided with a suitable filter bank 24 as shown. The mixed gas duct leads directly to a point of utilization such as a lumber drying kiln 2, or the like. Aside from suitable filters or screen means, the controlled temperature gasses from the mixed gas duct 18 are directly transmitted through outlets 19 into the drying kiln chamber as shown.

OPERATION

The hot gasses normally issuing from the exhaust stack 7 are diverted under the influence of the pumping means 12 into the recovery duct 8. The recovery conduit is connected to a point in the incinerator stack wherein relatively clean high temperature gasses exit from the incinerator's normal final filtering system. A combination of jet pump action and the constant volume pumping means 12 induces ambient air flow through the inlet conduit 14. The volume of ambient air permitted to enter the inlet duct 14 is directly controlled by the butterfly valve 15. Such valve may advantageously be a solenoid driven means responsive directly to the temperature and/or other load conditions found within the drying kiln or other related point of utilization. The thermostatically controlled butterfly valve controls the inflow of ambient air to the pre-mixing duct 16 and to the inlet of the constant volume pumping means and thus controls the proportion of hot to cold gasses and the end temperature of the fluid mixture in the mixed gas duct 18. Primary mixing of hot and cool gasses occurs in the pre-mixing duct 16 and subsequent mixing occurs in the constant volume pumping means itself and in the outlet manifold 17 and mixed gas duct 18.

It will be apparent to those skilled in the art that the particular dimensions of the components of the instant thermal recovery system have a direct bearing on its performance in particular applications and that such dimensions vary with each application. For example, in the typical lumber mill operation where an incinerator stack provides exhaust gasses within a temperature range of from 1000° to 1400° fahrenheit, the various gas ducts must be dimensioned so as to carry a sufficient volume of gas to satisfy the particular heat requirements of the end use which may be a drying kiln or other space heating user. Such end utilizations might require a gas temperature in the vicinity of 80° to 110° fahrenheit and a moderate flow velocity of from 25 to 50 cubic feet per second. Through appropriate calculations of heat losses and transmission lengths through standard thermodynamic formulae, the precise dimensions of the ducting may be readily determined.

In terms of design criteria, it should be noted that the mixing of relatively cool ambient air and hot gas from the recovery stack 8 is initiated in the pre-mixing duct 16 in order to assure that the gas pumping means 12 will not be exposed to prohibitively high temperatures. The pre-mixing duct 16 is dimensioned so as to allow turbulent flow of the gasses therein and proper mixing thereof. In a typical installation, a suitable pre-mixing duct is approximately eight times greater in length than diameter.

It may be seen that the present invention provides relatively simple and inexpensive means for reducing air pollution and for conserving energy by directly utilizing waste heat gasses for useful purposes. Although the invention has been described with reference to particular preferred embodiments, it should be apparent to those skilled in the art that many variations and modifications are possible within the spirit of the inventive concepts. No limitation is intended with respect to such variations and modifications except as comprehended by the scope of the appended claims.

We claim:

1. A pollution reducing-thermal recovery system having a source of heated gaseous fluid and user means for said fluid, said thermal recovery system comprising in combination and in stated order; recovery fluid communication means for communicating said user means directly with said source of heated gaseous fluid, ambient fluid communication means connected with said recovery fluid communication means at a point of confluence, said ambient fluid communication means connected with said recovery fluid communication means downstream of said source for communicating ambient fluid to said recovery fluid communication means at said point of confluence, automatic valve means for automatically controlling the flow of said ambient fluid through said ambient fluid communication means in response to a system load condition of said user means, primary mixing means disposed downstream of said point of confluence and upstream of said user means for mixing said ambient fluid from said ambient fluid communication means and said heated gaseous fluid from said recovery fluid communication means, pump means having inlet means and outlet means, said inlet means being in direct communication with said primary mixing means for pumping mixed ambient and heated gaseous fluids from said primary mixing means to said outlet means, mixed fluid communication means connected with said outlet means for directly communicating said mixed ambient and heated gaseous fluids to said user means.

2. The invention of claim 1 wherein said source of heated gaseous fluid is a waste products incinerating means having a gas outlet stack in direct communication with said recovery fluid communication means.

3. The invention of claim 2 wherein said recovery fluid communication means include a plurality of lengths of fluid conduit, said lengths of fluid conduit being provided with thermal expansion means.

4. The invention of claim 3 wherein said lengths of fluid conduit are at least partially covered by thermal insulation means for blocking the flow of heat energy from said lengths of fluid conduit.

5. The invention of claim 2 wherein said user means include a drying kiln.

6. The invention of claim 1 wherein said pump means include a constant volume gas pump.

7. The invention of claim 6 wherein said constant volume gas pump is a centrifugal compressor.

8. The invention of claim 6 wherein said automatic valve means include a movable valve member disposed within said ambient fluid communication means and positionable in any of a plurality of positions between first and second communication means fully open and fully closed positions, said automatic valve means further including actuator means for actuating said movable valve member to any of said plurality of positions.

9. The invention of claim 8 wherein said automatic valve means further include load signal means for sensing a load indicating parameter at a first predetermined location in said user means and for causing said actuator means to actuate said movable valve member to one of said plurality of positions.

10. The invention of claim 9 wherein said actuator means include an electrically operated solenoid.

11. The invention of claim 9 wherein said load indicating parameter is temperature and wherein said load signal means include a temperature responsive device positioned to measure the temperature of said user means.

12. The invention of claim 1 further including filter means located between said pumping means and said user means for filtering out large particles and impurities from said heated gaseous fluid before passage of said fluid to said user means.

* * * * *